US011163308B2

(12) United States Patent
Alawieh et al.

(10) Patent No.: US 11,163,308 B2
(45) Date of Patent: Nov. 2, 2021

(54) METHOD FOR CREATING A DIGITAL MAP FOR AN AUTOMATED VEHICLE

(71) Applicant: Robert Bosch GmbH, Stuttgart (DE)

(72) Inventors: Ali Alawieh, Abstatt (DE); Daniel Zaum, Sarstedt (DE); Peter Christian Abeling, Hannover (DE)

(73) Assignee: Robert Bosch GmbH, Stuttgart (DE)

( * ) Notice: Subject to any disclaimer, the term of this patent is extended or adjusted under 35 U.S.C. 154(b) by 247 days.

(21) Appl. No.: 16/004,548

(22) Filed: Jun. 11, 2018

(65) Prior Publication Data

US 2018/0364720 A1 Dec. 20, 2018

(30) Foreign Application Priority Data

Jun. 14, 2017 (DE) .......................... 102017210070.2

(51) Int. Cl.
*G05D 1/02* (2020.01)

(52) U.S. Cl.
CPC ......... *G05D 1/0212* (2013.01); *G05D 1/0231* (2013.01); *G05D 1/0255* (2013.01); *G05D 1/0257* (2013.01); *G05D 1/0274* (2013.01); *G05D 1/0278* (2013.01); *G05D 1/0291* (2013.01)

(58) Field of Classification Search
None
See application file for complete search history.

(56) References Cited

U.S. PATENT DOCUMENTS

| 2009/0254248 | A1 | 10/2009 | Park et al. | |
|---|---|---|---|---|
| 2011/0161032 | A1* | 6/2011 | Stahlin | G01C 21/30 702/94 |
| 2013/0060461 | A1* | 3/2013 | Wong | B66F 9/063 701/408 |
| 2014/0379254 | A1* | 12/2014 | Miksa | G01C 21/3811 701/450 |
| 2015/0057871 | A1* | 2/2015 | Ono | G05D 1/0248 701/23 |
| 2015/0151725 | A1* | 6/2015 | Clarke | G06T 7/70 701/28 |

(Continued)

FOREIGN PATENT DOCUMENTS

| DE | 60122963 T2 | 9/2007 |
|---|---|---|
| DE | 102014217847 A1 | 3/2016 |
| DE | 102015218809 A1 | 3/2017 |

OTHER PUBLICATIONS

Ryan Mark, How to Find Changing Distance between Two Moving Objects, WayBack Machine copy (Year: 2016).*

(Continued)

*Primary Examiner* — Lina M Cordero
(74) *Attorney, Agent, or Firm* — Norton Rose Fulbright US LLP; Gerard Messina

(57) ABSTRACT

A method for creating a digital map for an automated vehicle, including identifying a first vehicle by a second vehicle or the second vehicle by the first vehicle, the first vehicle and/or the second vehicle being identified as data-detecting members of a creation process of the digital map; ascertaining a distance of the first vehicle from the second vehicle and/or a distance of the second vehicle from the first vehicle; and transmitting defined data of the vehicles and the distance between the vehicles to a creation unit for creating the digital map.

7 Claims, 5 Drawing Sheets

(56) References Cited

U.S. PATENT DOCUMENTS

| | | | |
|---|---|---|---|
| 2015/0241226 A1* | 8/2015 | Engelman | G01C 21/34 701/25 |
| 2015/0316386 A1* | 11/2015 | Delp | G01C 21/3658 701/532 |
| 2016/0357187 A1 | 12/2016 | Ansari | |
| 2017/0008521 A1* | 1/2017 | Braunstein | G01C 21/36 |
| 2017/0038477 A1* | 2/2017 | Schmid | G01S 19/51 |
| 2017/0067744 A1* | 3/2017 | Duan | G01C 21/3667 |
| 2017/0177950 A1* | 6/2017 | Hasberg | G06K 9/00476 |
| 2017/0285657 A1* | 10/2017 | Sakai | G05D 1/0274 |
| 2017/0285658 A1* | 10/2017 | Sakai | G01S 13/931 |

OTHER PUBLICATIONS

Ryan Mark, How to Find Changing Distance between Two Moving Objects (Year: 2016).*

* cited by examiner

METHOD FOR CREATING A DIGITAL MAP FOR AN AUTOMATED VEHICLE

CROSS REFERENCE

The present application claims the benefit under 35 U.S.C. § 119 of German Patent Application No. 102017210070.2 filed on Jun. 14, 2017, which is expressly incorporated herein by reference in its entirety.

FIELD

The present invention relates to a method for creating a digital map for an automated vehicle. The present invention furthermore relates to a device for creating a digital map for an automated vehicle. The present invention furthermore relates to a computer program product.

BACKGROUND INFORMATION

Techniques are available from the field of simultaneous localization and mapping (SLAM) to create surroundings maps for individual measuring vehicles or large vehicle fleets with the aid of sensor data. Corresponding applications can be found above all in the fields of robotics, logistics, automotive engineering, aviation, consumer goods, etc.

To create exact surroundings maps from vehicle sensor observations (for example, in the form of radar, video, LIDAR etc.), in particular graph-based SLAM methods have become established.

One disadvantage of the described methods is shown in FIG. 1, which illustrates a principle of SLAM without local reference. An automated measuring vehicle (for example, a robot, not shown) moves along an unknown path having defined measuring positions $x_0 \ldots x_3$, the measuring vehicle being able to estimate its movement with the aid of movement estimates $u_0 \ldots u_3$ (for example, with the aid of an inertial sensor system, a wheel rotation sensor system, etc.). From every position, the measuring vehicle ascertains its surroundings with the aid of a number of measurements by aiming at identified observations of landmarks $L_0 \ldots L_{16}$. Each of the landmarks may, in some circumstances, be observed multiple times from each observation point, and thus there are more landmark measurements than actual landmarks.

The goal of graph SLAM or full SLAM (indicated by an arrow) is to ascertain the true path $x_0 \ldots x_n$ of the measuring vehicle, which the measuring vehicle has taken through the surroundings, or the real positions $y_0 \ldots y_8$ of the surroundings, from the measurements of the measuring vehicle shown in the top section of FIG. 1. This is carried out by a comparison of the landmarks which were ascertained at each measuring point. In this process, the true map of the surroundings is also to be ascertained. This takes place by corresponding measurements of the same landmark from different measuring points, these being used to simultaneously carry out a measuring vehicle path estimation and the surroundings identification.

Methods and systems for mapping traveled roads with the aid of sensors (for example, cameras, radar sensors, ultrasonic sensors, etc.) installed in the vehicles are available. In addition to the described sensors, these systems generally also include a radio interface (for example, implemented via a connectivity unit) for transmitting the measured sensor data to a server. In this way, entire vehicle fleets may map their collective surroundings with the aid of the vehicle sensors by transmitting their sensor data, for example, to a server. The transmission of such so-called "fleet mapping data" is known.

The sensor data are collected on the server, and a digital map for the relevant road segment is generated from the data from multiple trips and/or vehicles. The digital maps (also referred to as HAD maps, AD maps or HD maps) ascertained in this way are used, among other things, to allow the localization of automatically driving vehicles in the digital map (for example, for an ascertainment of trajectories). So-called landmarks are used here, which are charted in the digital map with their exact geographical positions.

Typical landmarks are, for example, roadway markings, road signs, guard rails, etc. When an automatically driving vehicle detects one or multiple landmark(s) with the aid of the vehicle sensor system and is able to unambiguously locate these landmarks in the digital map, a very precise relative position of the vehicle relative to the landmark on the digital map may be derived. A density and quality of the landmarks thus considerably affects a quality of the local localization with respect to the accuracy of the ascertained position. In reality, route sections exist in which many and very useful landmarks are present, as well as sections in which a poor coverage of landmarks exists, so that this may in some circumstances result in a poor quality of the localization.

SUMMARY

It is an object of the present invention to provide an improved method for creating a digital map for an automated vehicle. According to a first aspect of the present invention, an example method is provided for creating a digital map for an automated vehicle, including the steps:
  identifying a first vehicle by a second vehicle or the second vehicle by the first vehicle, the first vehicle and/or the second vehicle being identified as datadetecting users of a creation process of the digital map;
  ascertaining a distance of the first vehicle from the second vehicle and/or a distance of the second vehicle from the first vehicle; and
  transmitting defined data of the vehicles and the distance between the vehicles to a creation unit for creating the digital map.

In this way, the ascertained distance from the other vehicle is transferred into an edge of the SLAM graph, which is inserted into the graph, whereby, as a result, an improved optimization of the digital map is possible. Advantageously, in this way more data are made available to the creation unit, so that an improved optimization of the digital map may be carried out. Advantageously, the method requires absolutely no localization data whatsoever and may thus be used for interior localization maps.

According to a second aspect of the present invention, an example device is provided for creating a digital map for an automated vehicle, including:
  a detection element situated in a second vehicle for identifying the first vehicle by the second vehicle, and for ascertaining a distance of the second vehicle from the first vehicle; and/or
  a detection element situated in the first vehicle for identifying the second vehicle by the first vehicle, and for ascertaining a distance of the first vehicle from the second vehicle; and
  a transmission element situated in the second vehicle for transmitting defined data of the vehicles to a creation unit for creating the digital map; and/or a transmission element situated in the first vehicle for transmitting defined data of the vehicles to the creation unit for creating the digital map.

Advantageous refinements of the example method are described herein.

One advantageous refinement of the example method provides that the ascertainment of the distance between the vehicles is carried out with the aid of at least one of video, radar, ultrasonic, laser, radio or position finding. In this way, different methods may be used for ascertaining the distance of the vehicles from each other, where different sensor topologies are usable for the method.

A further advantageous refinement of the example method provides that the identification of the vehicles with the aid of an identification of a license plate and/or means may be used different types for the identification of the vehicles.

A further advantageous refinement of the example method provides that GPS data of the vehicles are detected and transmitted to the creation unit. In this way, the creation of the digital map in the SLAM process may be even further improved.

A further advantageous refinement of the example method provides that the data of the vehicles are buffered in the vehicles prior to the transmission to the creation unit. In this way, the transmission of the detected data may be carried out in real time or with a time delay. Advantageously, the transmission of the data does not have to be carried out in real time in the second variant.

The present invention is described in greater detail below with further features and advantages based on several figures.

Described method features result similarly from correspondingly described device features, and vice versa. This means in particular that features, technical advantages and statements regarding the method result similarly from corresponding statements, features and advantages regarding the device for creating a digital map for an automated vehicle, and vice versa.

DETAILED DESCRIPTION OF EXAMPLE EMBODIMENTS

Hereafter, an automated motor vehicle shall synonymously also be understood to mean a semi-automated motor vehicle, an autonomous motor vehicle, and a semi-autonomous motor vehicle.

The present invention in particular includes creating a digital map for an automated vehicle according to the SLAM principle in an improved manner.

The conventional graph SLAM algorithm may be divided into two fundamental steps:

1. SLAM Front-end

In this step, identical measuring positions between two trips of the same area are ascertained by a comparison of observed landmarks. The identified relation between the described measuring positions from different trips is represented in a graphical illustration expressed as distances ("edges").

2. SLAM back-end

In this step, an optimization of the graph resulting from the preceding front-end step is carried out with the goal of finding an optimal approach that meets all boundary conditions.

Figure 1:
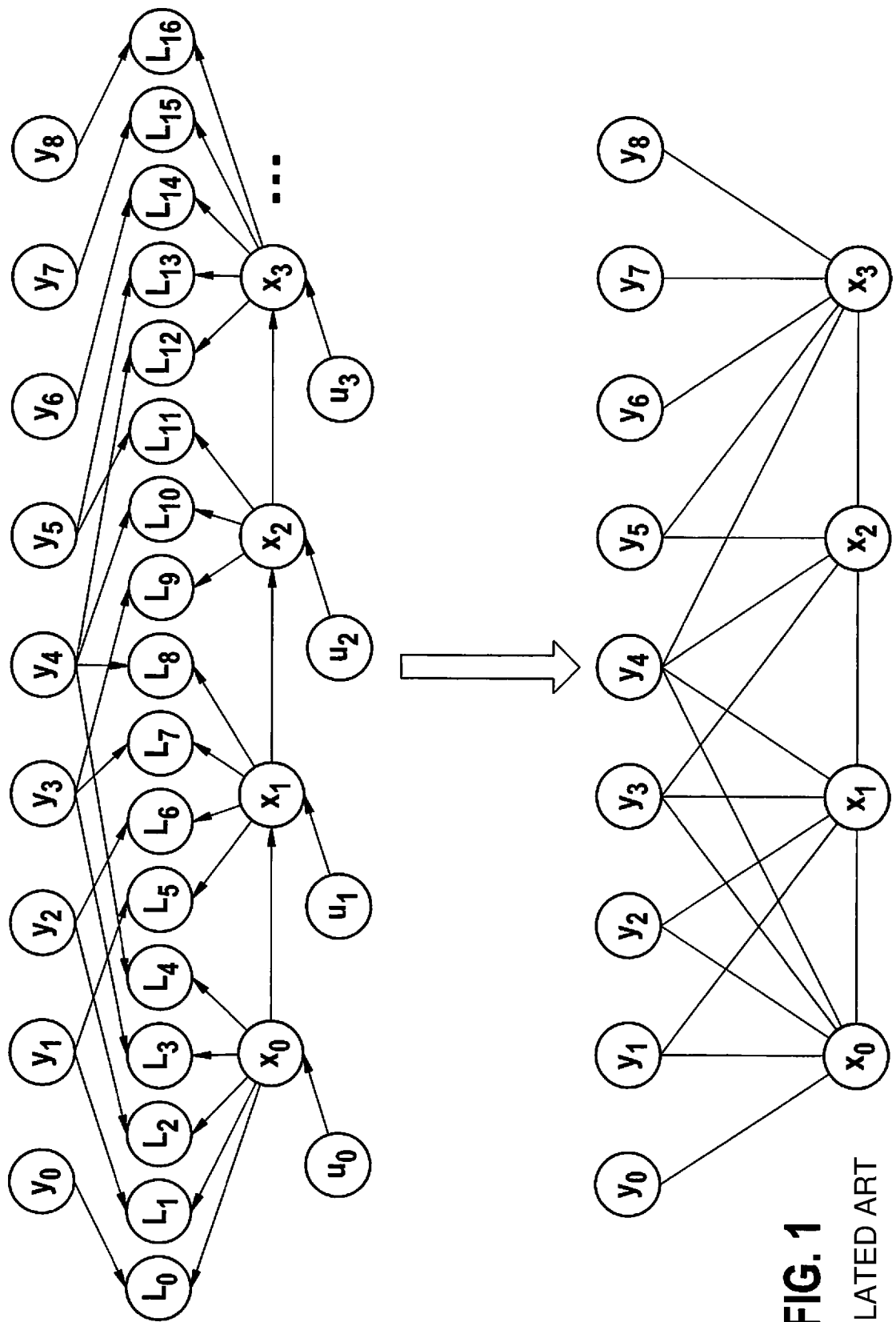
FIG. 1 shows a schematic representation of a mode of action of SLAM.
Figure 2:
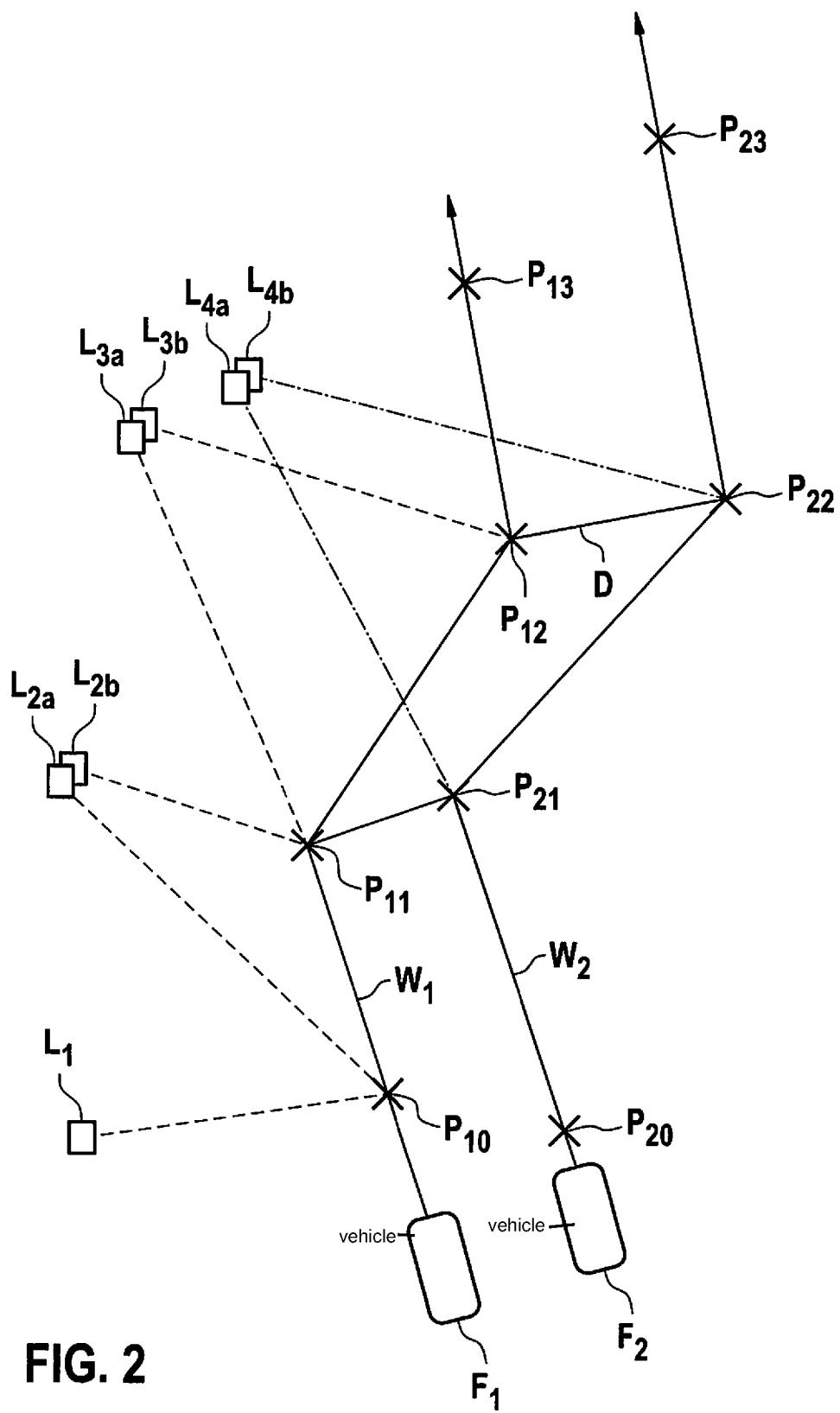
FIG. 2 shows a schematic representation of a mode of action of a conventional SLAM method with local reference.

A mode of action of the conventional SLAM front-end step is shown in FIG. 2.

Illustrated are sections of two paths W1, W2, which are each traveled by an automated vehicle. Path W1 includes measuring points $P_{10}$, $P_{11}$, $P_{12}$, $P_{13}$, and path W2 includes measuring points $P_{20}$, $P_{21}$, $P_{22}$, $P_{23}$, etc.

From the described measuring points, the vehicles detect landmarks with the aid of a sensor system, for example landmark $L_1$ from measuring point $P_{10}$, and landmarks $L_{2a}$, $L_{2b}$ from measuring point $P_{11}$. From measuring point $P_{12}$, landmarks $L_{3a}$, $L_{3b}$ are detected by the first vehicle. Landmarks $L_{4a}$, $L_{4b}$ are detected by the second vehicle from measuring point $P_{22}$. It is now the task of the SLAM method to determine, from the data of the landmarks $L_{3a}$, $L_{3b}$, $L_{4a}$, $L_{4b}$, whether these presumed four landmarks $L_{3a}$, $L_{3b}$, $L_{4a}$, $L_{4b}$ are one and the same landmark.

This ascertainment is carried out based on the observations of the ascertainment unit of the vehicles, a relative position of the two vehicles at measuring positions $P_{12}$, $P_{22}$ being ascertained from the data of the detected landmarks, a corresponding distance D being stored in a SLAM graph. This distance D may be used to carry out an optimization of the digital map.

In the related art according to FIG. 2, the detection of the landmarks by the vehicles is generally carried out in a time-shifted manner, the two vehicles not being aware of each other's existence, the detected data being transmitted to the creation unit (for example, server, not shown) at different points in time and being processed thereby into a digital map.

It is provided to utilize a circumstance that two ascertaining vehicles carry out a measuring trip for ascertainment of landmarks at the same time and are able to "see" or detect or unambiguously identify one another. This is indicated, in principle, in FIG. 3, which in principle describes a basic mode of action of the provided method.

Figure 3:
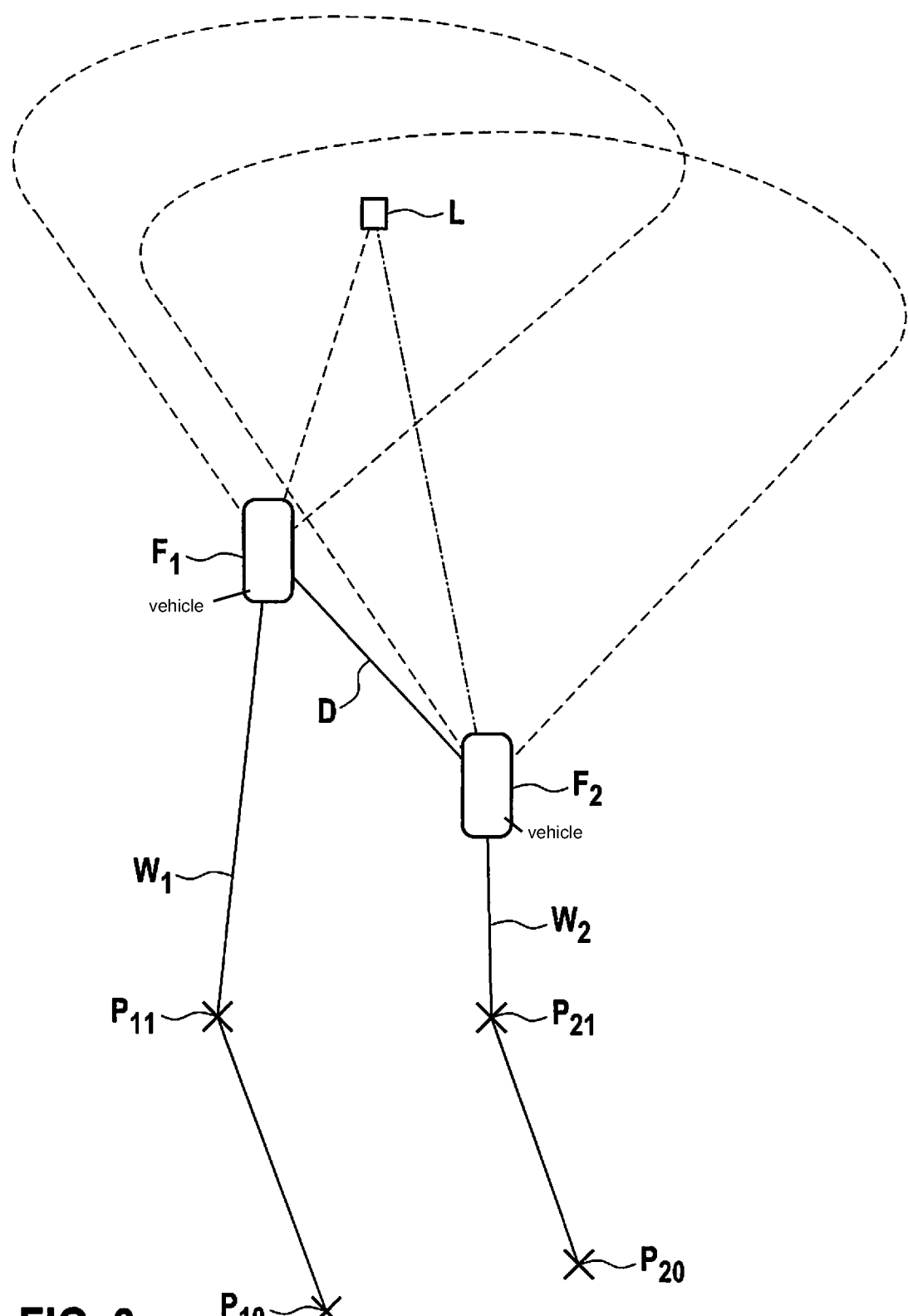
FIG. 3 shows a schematic representation of a mode of action of a provided SLAM method with local reference.

FIG. 3 shows a scenario similar to that of FIG. 2, with the difference that now both vehicles $F_1$ and $F_2$ are situated within the detection range and thereby are able to see one another, both vehicles $F_1$ and $F_2$ detecting at least one shared landmark L. In the case of the scenario of FIG. 3, second vehicle $F_2$ identifies first vehicle $F_1$ during its measuring trip. In particular, second vehicle $F_2$ recognizes that first vehicle $F_1$ detects landmark L and may thereby carry out a direct ascertainment of the relative position to first vehicle $F_1$. This relative ascertainment is incorporated into a data set which second vehicle $F_2$ contributes to the SLAM graph and which is created from all vehicle measurements.

In the graph SLAM process, this piece of information may thus advantageously be used to establish an association between measuring positions (for example, $P_{11}$, $P_{21}$) of vehicles $F_1$, $F_2$, without having to carry out a correlation of landmark measurements as is conventionally required according to FIG. 2.

This advantageously results in an improved optimization of the digital map after additional pieces of information for its optimization are available. Furthermore, this advantageously results in a reduced process time for carrying out the described optimization since fewer distances based on comparisons of landmarks have to be added to the SLAM graph.

In this case, distance D between two vehicles $F_1$, $F_2$ is thus transmitted to a creation unit (not shown), these data being used to optimize the digital map. Due to the fact that two vehicles $F_1$, $F_2$ identified the same landmark L almost simultaneously, it may be ascertained in what position this must have taken place. Thus, distance D may be used for processing a position of two vehicles $F_1$, $F_2$, and a digital map may thus be created from multiple measuring trips.

It is necessary that two vehicles are able to "see" one another, and that these two vehicles have detected at least one shared landmark L. It is thus necessary that the two vehicles are situated in one area, the first vehicle being able to detect the relative position of the second vehicle and/or vice versa, this prerequisite having to be present at least for a section of the measuring trip. Furthermore, it must be possible that the first vehicle is able to identify the second vehicle with absolute certainty, for example with the aid of a visual inspection or by detecting the license plate, vehicle ID, vehicle radio identifier etc.

It shall be understood that the provided method may be carried out with more than two vehicles.

Even though mention is made above of an identification of first vehicle $F_1$ by second vehicle $F_2$, it shall be understood that the method may also be implemented by an identification of second vehicle $F_2$ by first vehicle $F_1$ and/or by a mutual identification of two vehicles $F_1$, $F_2$. Furthermore, it shall be understood that the two vehicles may be members of a fleet formation, in which many vehicles that are able to identify each other may be present which carry out the provided method.

Advantageously, the provided method may be implemented as software using program code for running on an electronic processor device, whereby an easy modifiability and adaptability of the method is supported.

Figure 4:
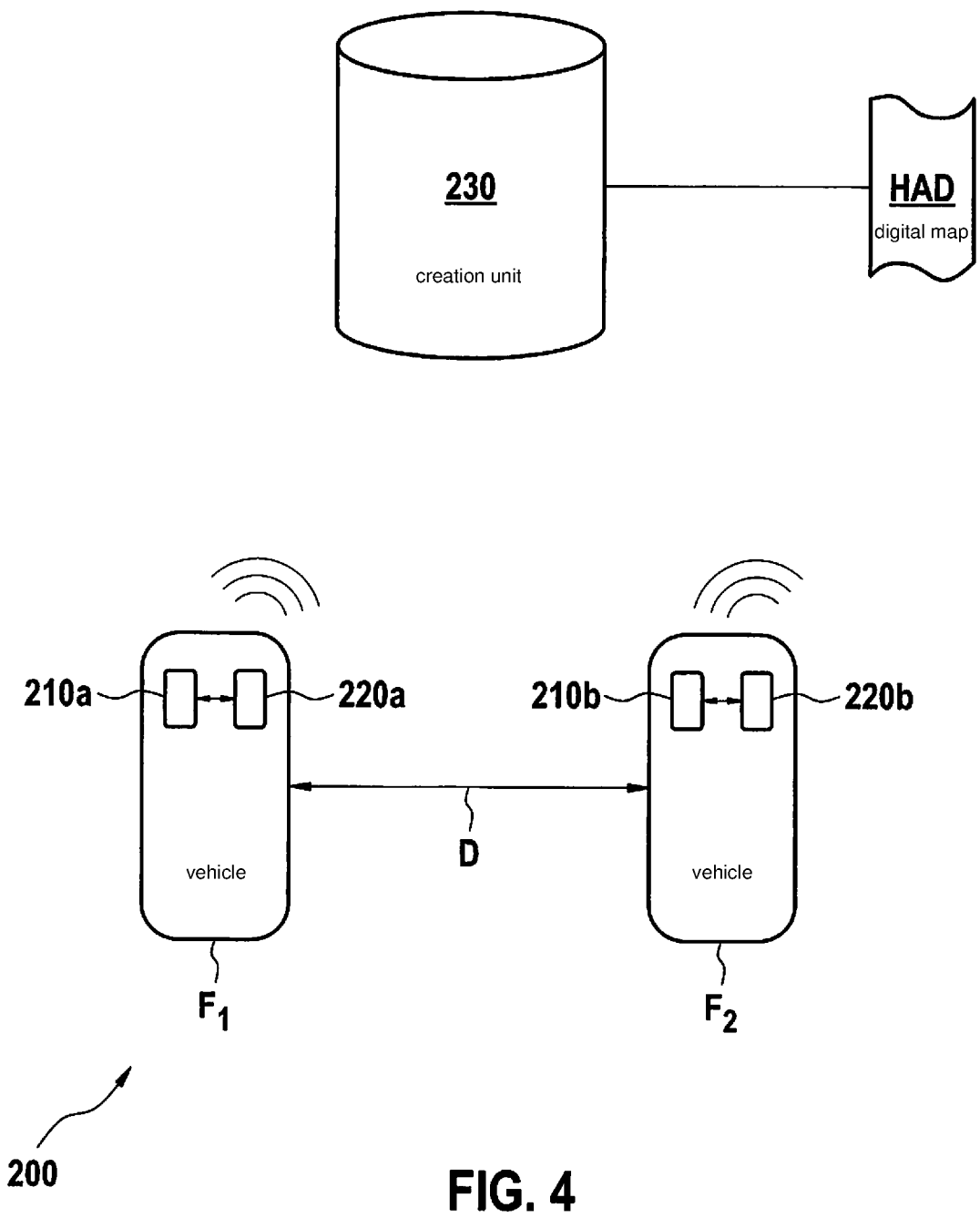
FIG. 4 shows a block diagram of a provided device for carrying out the provided method.

FIG. 4 shows a simplified block diagram of a device 200 for creating a digital map HAD for an automated vehicle.

A detection element 210a situated in first vehicle $F_1$ for detecting landmarks (not shown) and for ascertaining distance D from second vehicle $F_2$ during a measuring trip is apparent. Detection element 210a may be designed as one of video, radar, ultrasonic, laser, radio or position finding element. Detection element 210a is furthermore provided for identifying second vehicle $F_2$, in particular an identification of second vehicle $F_2$ being provided as a data-detecting user of a creation process of digital map HAD. The identification may be carried out, for example, with the aid of an identification of a license plate of second vehicle $F_2$, a radio identifier of second vehicle $F_2$, or the like.

Furthermore, a transmission element 220a situated in first vehicle $F_1$ is apparent, which is functionally connected to detection element 210a and which is provided for the (preferably wireless) transmission of the detected data and of defined data of vehicles $F_1$, $F_2$ to creation unit 230 for the creation of digital map HAD.

Furthermore, a detection element 210b situated in second vehicle $F_2$ for detecting landmarks, for ascertaining distance D from first vehicle $F_1$ is apparent. Furthermore, a transmission element 220b is apparent, which is provided for transmitting the detected data and data of vehicles $F_1$, $F_2$ to creation unit 230 for the creation of digital map HAD.

The transmission of the detected data may take place in real time during a measuring trip of vehicles $F_1$, $F_2$. As an alternative or in addition, it is also possible to store the data in a buffer unit (not shown) of vehicles $F_1$, $F_2$ and to transmit them to creation unit 230 only after the measuring trip has ended.

Advantageously, provided device 200, including the described elements, may be implemented as software including program code means for running on creation unit 230, where an easy modifiability and adaptability of the device is supported.

Figure 5:
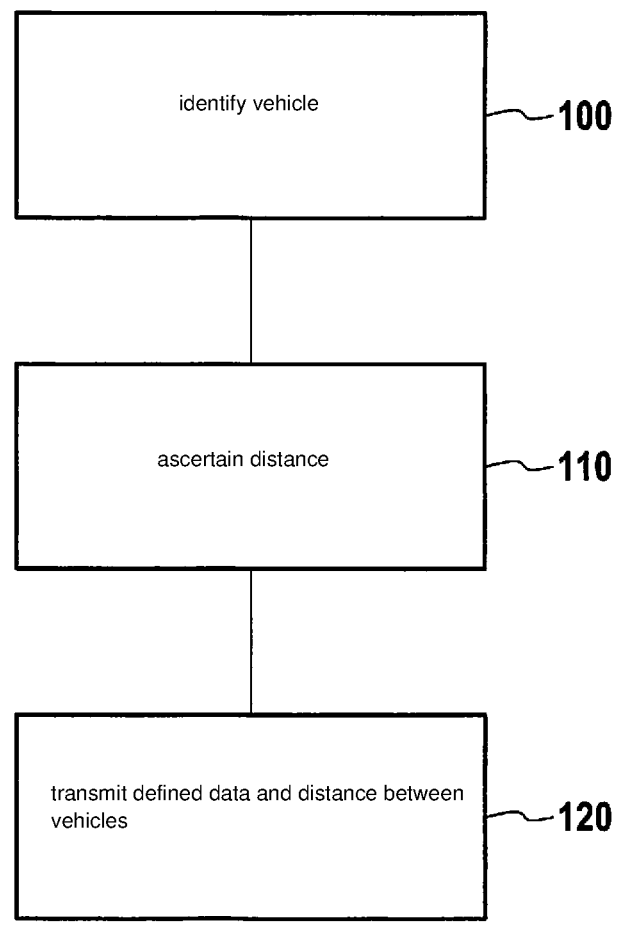
FIG. 5 shows a schematic sequence of a provided method for creating a digital map.

FIG. 5 shows a schematic sequence of a successful execution of the example method according to the present invention.

In a step 100, an identification of a first vehicle $F_1$ by a second vehicle $F_2$ or of second vehicle $F_2$ by first vehicle $F_1$ is carried out, first vehicle $F_1$ and/or second vehicle $F_2$ being identified as data-detecting users of a creation process of digital map HAD.

In a step 110, an ascertainment of a distance D of first vehicle $F_1$ from second vehicle $F_2$ and/or a distance D of second vehicle $F_2$ from first vehicle $F_1$ is carried out.

In a step 120, a transmission of defined data of vehicles $F_1$, $F_2$ and of distance D between vehicles $F_1$, $F_2$ to a creation unit 240 for creating digital map HAD is carried out.

Those skilled in the art will suitably modify the features of the present invention and/or combine them with each other, without departing from the present invention.

What is claimed is:

1. A method comprising:
    using, by a server, a sensor and a processor system of a first traveling vehicle to obtain, via a wireless interface, a unique identification of a second traveling vehicle, a sensed distance of the second traveling vehicle to the first traveling vehicle, and a first sensed location identification of a detected object;
    using, by the server, a sensor system of the second traveling vehicle to obtain a second sensed location identification of the detected object;
    using, by the server, the unique identification of the second traveling vehicle obtained using the processor system of the first traveling vehicle to confirm that the second sensed location identification is received from the second traveling vehicle whose distance to the first traveling vehicle has been obtained from the first traveling vehicle; and
    generating, by the server, a digital map based on the confirmation, the unique identification of the second traveling vehicle, the sensed distance of the second traveling vehicle to the first traveling vehicle, the first sensed location identification of the detected object, and the second sensed location identification of the detected object.

2. The method as recited in claim 1, wherein the sensed distance of the second traveling vehicle to the first traveling vehicle is sensed using at least one of video, radar, ultrasonic, laser, radio, and position finding.

3. The method as recited in claim 1, wherein the obtainment of the unique identification of the second traveling vehicle is carried out based on at least one of: (i) an identification of a license plate and (ii) a radio identifier of the second traveling vehicle.

4. The method as recited in claim 1, wherein GPS data of the first traveling vehicle and the second traveling vehicle are detected and transmitted to the server.

5. The method as recited in claim 1, wherein the sensed distance is sensed based on a combination of a sensing by the first traveling vehicle of a location of the second traveling vehicle and the first sensed location identification of the detected object.

6. The method of claim 1, further comprising using, by the server, the first sensed location identification of the detected object obtained via the first traveling vehicle, the sensed distance of the second traveling vehicle to the first traveling vehicle obtained via the first traveling vehicle, the confirmation based on the unique identification of the second traveling vehicle obtained from the first traveling vehicle, and the second sensed location identification of the detected object obtained via the second traveling vehicle to precisely identify respective geo-locations of the first traveling vehicle and the second traveling vehicle, wherein the generation of the digital map includes updating the digital map by adding an environmental object at a particular location in the digital map, the particular location being determined based on (a) sensor data from at least one of the first traveling vehicle representing the environmental object and a location of the environmental object and (b) at least one of the precisely identified respective geo-locations of the first traveling vehicle and the second traveling vehicle.

7. A non-transitory computer-readable data carrier on which is stored a computer program including program code that is executable by an electronic processing device and that, when executed by the electronic processing device, causes the electronic processing device to perform a method, the method comprising:

using, by a server, a sensor and a processor system of a first traveling vehicle to obtain, via a wireless interface, a unique identification of a second traveling vehicle, a sensed distance of the second traveling vehicle to the first traveling vehicle, and a first sensed location identification of a detected object;

using, by the server, a sensor system of the second traveling vehicle to obtain a second sensed location identification of the detected object;

using, by the server, the unique identification of the second traveling vehicle obtained using the processor system of the first traveling vehicle to confirm that the second sensed location identification is received from the second traveling vehicle whose distance to the first traveling vehicle has been obtained from the first traveling vehicle; and generating, by the server, a digital map based on the confirmation, the unique identification of the second traveling vehicle, the sensed distance of the second traveling vehicle to the first traveling vehicle, the first sensed location identification of the detected object, and the second sensed location identification of the detected object.

* * * * *